(12) United States Patent
Zhao

(10) Patent No.: US 11,092,737 B2
(45) Date of Patent: Aug. 17, 2021

(54) BACKLIGHT MODULE AND DISPLAY DEVICE

(71) Applicants: BEIJING BOE CHATANI ELECTRONICS CO., LTD., Beijing (CN); BOE TECHNOLOGY GROUP CO., LTD., Beijing (CN)

(72) Inventor: Xiangwei Zhao, Beijing (CN)

(73) Assignees: BEIJING BOE CHATANI ELECTRONICS CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/551,922

(22) Filed: Aug. 27, 2019

(65) Prior Publication Data

US 2020/0209457 A1 Jul. 2, 2020

(30) Foreign Application Priority Data

Jan. 2, 2019 (CN) .......................... 201920003059.4

(51) Int. Cl.
*G02F 1/1333* (2006.01)
*F21V 8/00* (2006.01)

(52) U.S. Cl.
CPC ....... *G02B 6/009* (2013.01); *G02F 1/133308* (2013.01); *G02F 1/133317* (2021.01); *G02F 1/133331* (2021.01)

(58) Field of Classification Search
CPC ................................. G02F 1/133308
See application file for complete search history.

(56) References Cited

U.S. PATENT DOCUMENTS

| 2014/0176867 | A1* | 6/2014 | Huang | G02B 6/0081 349/65 |
| 2016/0255739 | A1* | 9/2016 | Yoo | G02B 6/0088 362/606 |
| 2016/0363723 | A1* | 12/2016 | Choi | G02B 6/0091 |
| 2019/0033662 | A1* | 1/2019 | Lee | G02F 1/133605 |

* cited by examiner

*Primary Examiner* — Edmond C Lau

(57) ABSTRACT

A backlight module and a display device are provided. The backlight module includes a backboard and a light source component; the backboard has a bearing surface; the light source component is located on the bearing surface; the backboard includes at least one fixing member located at an edge of the backboard, the fixing member extends along a first direction and is located on a side of the backboard away from the light source component; the first direction is a direction which is intersected with the bearing surface and from the light source component to the backboard.

16 Claims, 7 Drawing Sheets

BACKLIGHT MODULE AND DISPLAY DEVICE

BACKLIGHT MODULE AND DISPLAY DEVICE

The application claims priority to the Chinese patent application No. 201920003059.4 filed on Jan. 2, 2019, the entire disclosure of which is incorporated herein by reference as part of the present application.

TECHNICAL FIELD

Embodiments of the present disclosure relate to a backlight module and a display device.

BACKGROUND

At present, with continuous development of the market of display devices, liquid crystal display (LCD) has become the preferred choice for mainstream display devices for its advantages such as quick response speed, high integration level and small power consumption. LCD usually includes an array substrate, an opposed substrate and a LC molecule layer arranged between the array substrate and the opposed substrate. Because the LC molecule layer has no self-luminous function, it needs to adopt a backlight module for providing the LCD with a backlight source.

The backlight module is one of key components in a LCD panel. Generally, the backlight module includes: a light source; a backboard; a module frame disposed on the backboard to surround a periphery of the backboard; and a reflecting sheet, a light guide plate, an optical film and the like which are disposed on the backboard and are located at an inner side of the module frame. The inner side of the module frame of the backlight module may be provided with a LC panel which is consisted of an array substrate, an opposed substrate, and a LC layer arranged between the array substrate and the opposed substrate. In this way, the backlight module is capable of providing the LC panel with backlight having sufficient brightness and uniform distribution.

SUMMARY

Embodiments of the present disclosure provide a backlight module and a display device. The backlight module includes: a backboard having a bearing surface; and a light source component located on the bearing surface; the backboard includes at least one fixing member located at an edge of the backboard, the fixing member extends along a first direction and is located on a side of the backboard away from the light source component, and the first direction is a direction from the light source component to the backboard. By adding a fixing member on a backboard, the backlight module has no need of arranging a fastening buckle, so as to reduce the total width of the frame of the display device.

At least one embodiment of the present disclosure provides a backlight module, including a backboard having a bearing surface; and a light source component located on the bearing surface; the backboard includes at least one fixing member located at an edge of the backboard, the fixing member extends along a first direction and is located on a side of the backboard away from the light source component, and the first direction is a direction from the light source component to the backboard.

For example, in the backlight module provided by an embodiment of the present disclosure, the first direction is perpendicular to the bearing surface.

For example, in the backlight module provided by an embodiment of the present disclosure, the at least one fixing member includes a plurality of fixing members, the plurality of fixing members are arranged to be spaced from each other at the edge of the backboard along a circumference direction of the backboard.

For example, in the backlight module provided by an embodiment of the present disclosure, the fixing member includes a buckle structure.

For example, in the backlight module provided by an embodiment of the present disclosure, the backboard further includes a frame member located at the edge of the backboard, the frame member extends along a second direction and is located on a side of the backboard where the light source component is disposed, and the second direction is a direction from the backboard to the light source component.

For example, in the backlight module provided by an embodiment of the present disclosure, the frame member and the backboard are integrally formed, and the frame member is a bended edge of the edge of the backboard which is bent towards the second direction.

For example, in the backlight module provided by an embodiment of the present disclosure, a space between an orthographic projection of the fixing member on a plane of the bearing surface and an orthographic projection of the frame member on the plane of the bearing surface is greater than zero.

At least one embodiment of the present disclosure provides a display device including a backlight module, the backlight module includes: a backboard having a bearing surface; and a light source component located on the bearing surface; the backboard includes at least one fixing member located at an edge of the backboard, the fixing member extends along a first direction and is located on a side of the backboard away from the light source component, and the first direction is a direction from the light source component to the backboard.

For example, the display device provided by an embodiment of the present disclosure further includes a middle frame, and the fixing member is fixed with the middle frame to fix the backlight module on the middle frame.

For example, in the display device provided by an embodiment of the present disclosure, the fixing member includes a buckle structure, and the middle frame includes a buckle fitter structure configured to be engaged with the buckle structure.

For example, in the display device provided by an embodiment of the present disclosure, the buckle structure includes a buckle opening, and the buckle fitter structure includes a buckle projection configured to be engaged with the buckle opening.

For example, in the display device provided by an embodiment of the present disclosure, the backboard further includes a frame member located at the edge of the backboard, the frame member extends along a second direction and is located on a side of the backboard where the light source component is disposed, the second direction is a direction from the backboard to the light source component. The display device further includes: a liquid crystal (LC) panel disposed on a side of the light source component away from the backboard; and a cover plate disposed on a side of the LC panel away from the backboard; the LC panel and the cover plate are fixed with the frame member through a gel.

For example, in the display device provided by an embodiment of the present disclosure, the gel is located on a side of the frame member away from the light source component.

BRIEF DESCRIPTION OF THE DRAWINGS

In order to clearly illustrate the technical solutions of the embodiments of the present disclosure, the drawings of the embodiments will be briefly described in the following. Apparently, the described embodiments just relate to a part of the embodiments of the present disclosure without limiting the present disclosure thereto.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

At present, with continuous development of display technology, a full-screen design with narrow bezel has become the current development trend and research spot of display devices. However, due to the restriction in a width of dispensed adhesive through which a cover plate is lapped with the display device, a cover plate frame in the current market usually is greater than 1.9 mm.

Figure 1A:
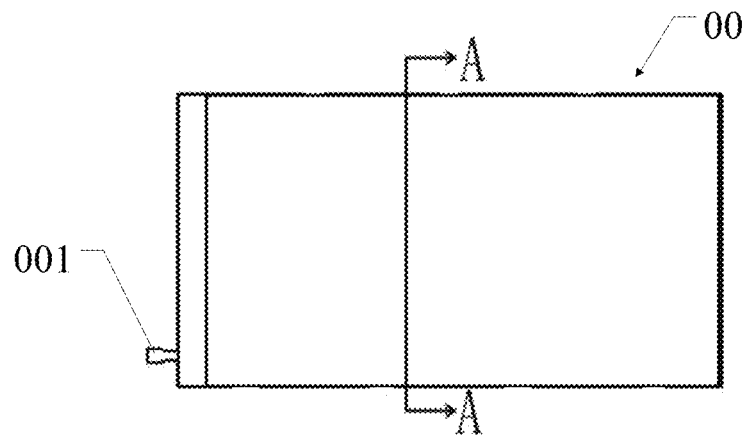
FIG. 1A is a plan view of a frame in a display device.
Figure 1B:
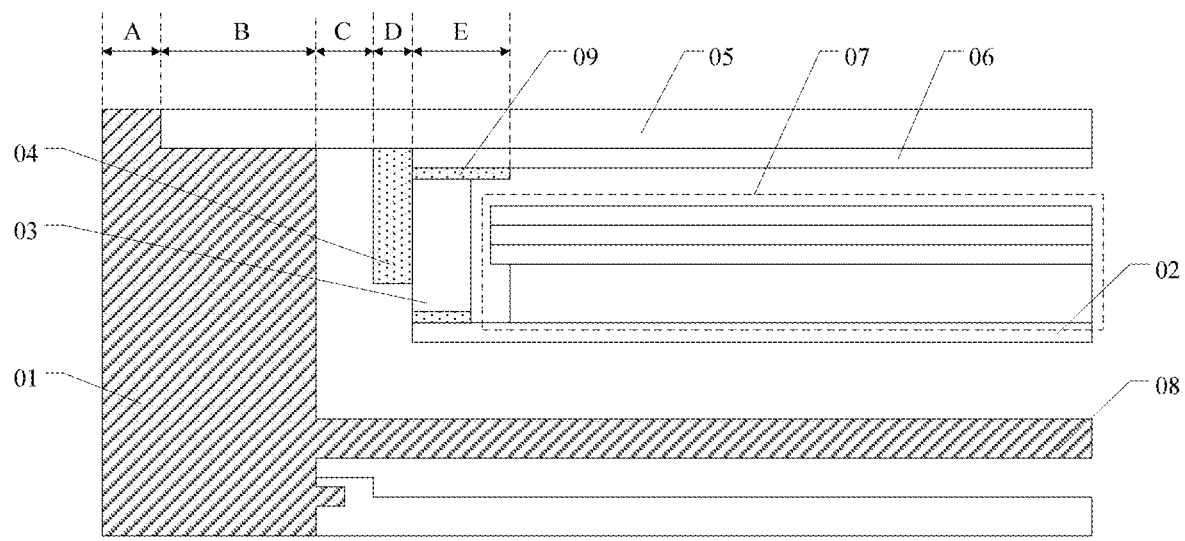
FIG. 1B is a cross-sectional view of a frame in a display device taken along AA direction in FIG. 1A.

FIG. 1A is a plan view of a frame in a display device; and FIG. 1B is a cross-sectional view of a frame in a display device taken along AA direction in FIG. 1A. As illustrated in FIG. 1A, the display device 00 can be a mobile phone; the display device includes a flexible printed circuit board (FPCB) 001 configured to be connected with a circuit board. As illustrated in FIG. 1B, the display device includes a housing 01, a backlight module backboard 02, a backlight module frame 03, a gel 04, a cover plate 05, a liquid crystal (LC) panel 06, a backlight module assembly 07, a mobile phone middle frame 08 and a dispensed adhesive 09. The cover plate 05 is lapped onto the housing 01, the backlight module frame 03 is connected with the cover plate 05 through the gel 04, and the LC panel 06 is connected with the backlight module frame 03 through the dispensed adhesive 09. As it can be seen, a total width M of a frame of the display device is a sum of: a width A of the housing 01, a width B of a portion where the cover plate 05 is lapped with the housing 01, a space C, a width D of the gel 04 and a width E of the dispensed adhesive 09; that is, M=A+B+C+D+E.

For example, the width B of the portion where the cover plate 05 is lapped with the housing 01 can be designed as 0.8 mm, the space C can be designed as 0.3 mm, the width D of the gel 04 can be designed as 0.2 mm, and the width E of the dispensed adhesive 09 can be designed as 0.7 mm, thus the total width M of the frame of the display device is M=2.0 mm+A.

Figure 2:
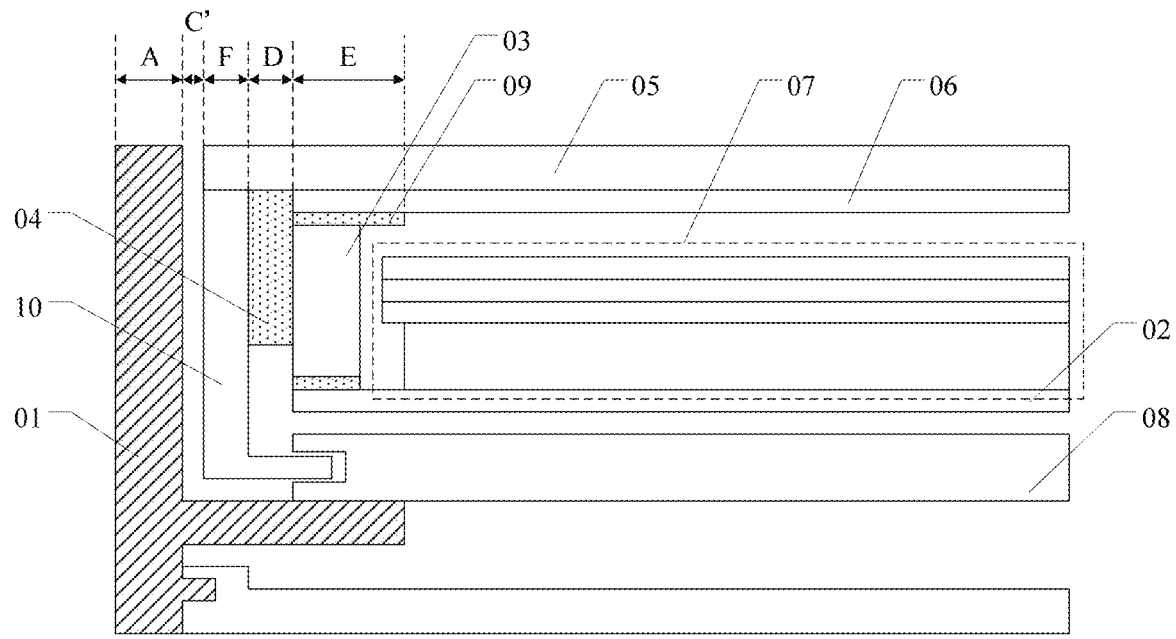
FIG. 2 is a cross-sectional view of a frame in another display device taken along AA direction in FIG. 1A.

FIG. 2 is a cross-sectional view of a frame in another display device taken along AA direction in FIG. 1A. As illustrated in FIG. 2, the display device includes a housing 01, a backlight module backboard 02, a backlight module frame 03, a gel 04, a cover plate 05, a liquid crystal (LC) panel 06, a backlight module assembly 07, a mobile phone middle frame 08, a dispensed adhesive 09 and a fastening buckle 10. As compared with the display device illustrated in FIG. 1A and FIG. 1B, the display device of FIG. 2 has such a design that the cover plate 05 is connected with the mobile phone middle frame 08 through the fastening buckle 10, and that the fastening buckle 10 is connected with the backlight module frame 03 through the gel 04. In such case, a total width M of the frame of the display device is a sum of: a width A of the housing, a space C', a width F of the fastening buckle 10, a width D of the gel 04 and a width E of the dispensed adhesive 09; that is, M=A+C'+F+D+E. Because C+F is smaller than B, the total width of the frame of the display device can be decreased.

For example, the space C' can be designed as small as possible, and can even be zero; the width F of the fastening buckle 10 can be designed as 0.5 mm; the width D of the gel 04 can be designed as 0.2 mm; thus the total width M of the frame of the display device is M=1.4 mm+A.

However, the fastening buckle 10 in the display device illustrated in FIG. 2 has a certain width, which limits a further decrease of the total width of the frame of the display device. In order to further decrease the total width of the frame, an embodiment of the present disclosure provides a backlight module and a display device. The backlight module includes a backboard and a light source component; the backboard includes a bearing surface; the light source component is located on the bearing surface; the backboard includes at least one fixing member located at an edge of the backboard, the fixing member extends along a first direction and is located on a side of the backboard away from the light source component; the first direction is a direction which is intersected with the bearing surface, and is from the light source component to the backboard. By adding a fixing member on a backboard, the backlight module has no need of arranging a fastening buckle, so as to reduce the total width of the frame of the display device.

Hereinafter, the backlight module and the display device provided by the embodiment of the present disclosure will be described in more details in conjunction with the drawings.

Figure 3:
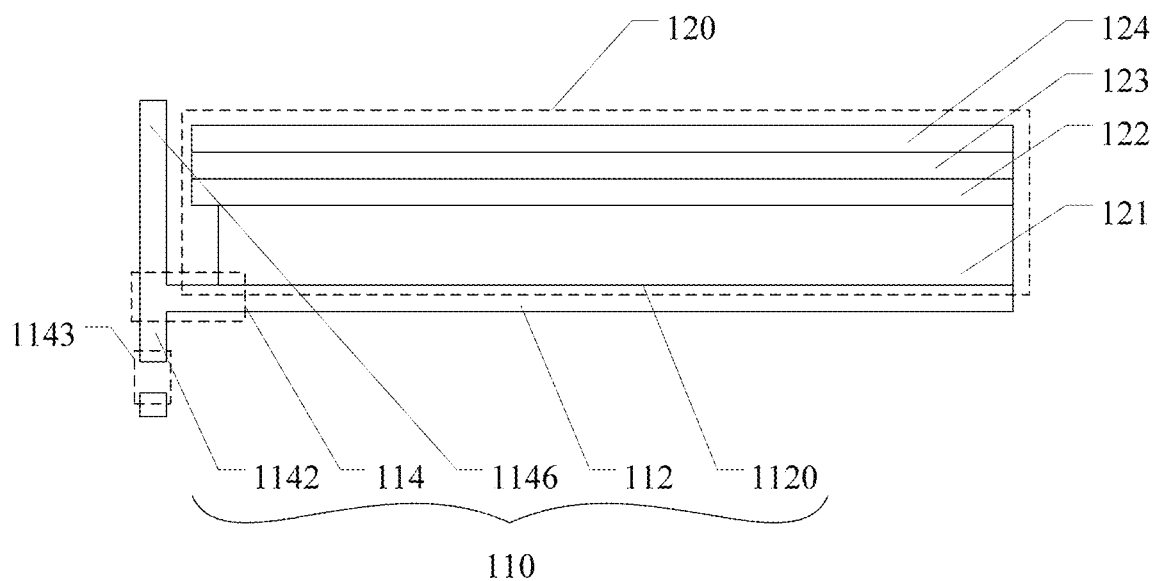
FIG. 3 is a partial cross-sectional view of a backlight module provided by an embodiment of the present disclosure.

FIG. 3 is a partial cross-sectional view of a backlight module provided by an embodiment of the present disclosure. As illustrated in FIG. 3, the backlight module includes a backboard 110 and a light source component 120; the backboard 110 includes a bearing surface 112; the light source component 120 is located on the bearing surface 112; the backboard 110 includes at least one fixing member 1142 located at an edge 114 of the backboard 110, the fixing member 1142 extends along a first direction intersected with (e.g., perpendicular to) the bearing surface 112 and is located on a side of the backboard 110 away from the light source component 120. That is to say, the fixing member 1142 is disposed on a side of the backboard 110 away from the light source component, and has a certain length in the first direction; the first direction is a direction from the light source component 120 to the backboard 110.

In the backlight module provided by the present embodiment, by adding a fixing member 1142 at an edge 114 of the backboard 110, the backlight module can be connected with other part(s) (e.g., the mobile phone middle frame) of the display device through the fixing member 1142 without an additionally arranged fastening buckle, so as to reduce a total width of a frame of a display device utilizing the backlight module, and hence to achieve a narrow bezel or even a frameless design of the display device.

For instance, in some examples, the fixing member is configured to be fixed with the middle frame, so as to fix the backlight module on the middle frame.

For instance, in some examples, as illustrated in FIG. 3, the first direction can be perpendicular to the bearing surface 112. That is to say, the fixing member 1142 can extend along the first direction which is perpendicular to the bearing surface 112.

For instance, in some examples, the fixing member 1142 can be a buckle structure. For instance, as illustrated in FIG. 3, the fixing member 1142 can include a buckle opening 1143, so as to achieve fixing by engaging the buckle opening 1143 with a buckle protrusion. The case where the fixing member 1142 is a buckle structure is convenient for an assembling operator to mount the backlight module into the display device, so as to reduce an assembling difficulty. Of course, the embodiment includes this case but is not limited thereto, and the fixing member can adopt other form(s). For example, the fixing member can include a threaded hole, and the backlight module is fixed in the display device through a screw and the threaded hole. For example, the above-described buckle opening and buckle protrusion can be engaged with each other in an interference fit, so as to achieve the objective of tight fastening.

For instance, in some examples, as illustrated in FIG. 3, the backboard 110 further includes a frame member 1146 located at the edge 114 of the backboard 110, the frame member 1146 extends along a second direction intersected with the bearing surface 1120 and is located on a side of the backboard 110 where the light source component 120 is disposed. That is to say, the fixing member 1142 and the frame member 1146 are located at two sides of the backboard 110, respectively. The frame member 1146 can replace the role of the backlight module frame of the display device illustrated in FIG. 1A, FIG. 1B and FIG. 2. On one aspect, the frame member 1146 can protect the light source component 120, and prevent from the problem that the light source component 120 may be damaged due to an impact during transportation and usage. On another aspect, the frame member 1146 can be fixed with a part such as LC panel and cover plate through the gel, so as to achieve fixing the part such as LC panel and cover plate with the backlight module. The second direction is a direction from the backboard 110 to the light source component 120.

For instance, in some examples, as illustrated in FIG. 3, the first direction is opposite to the second direction. Upon the first direction being a direction perpendicular to the bearing surface 112, the second direction is also perpendicular to the bearing surface 112.

For instance, in some examples, as illustrated in FIG. 3, the fixing member 1142 and the backboard 110 can be integrally formed, that is, being integrally formed by using a same material, so as to reduce the assembling difficulty.

For instance, as illustrated in FIG. 3, the fixing member 1142 can be a bended edge of the edge 114 of the backboard 110 which is bent towards the first direction, so as to reduce a manufacturing difficulty of the backboard.

For instance, in some examples, as illustrated in FIG. 3, the frame member 1146 and the backboard 110 can be integrally formed, and the frame member 1146 can be a bended edge of the edge 114 of the backboard 110 which is bent towards the second direction, so as to reduce the manufacturing difficulty of the backboard.

Figure 4A:
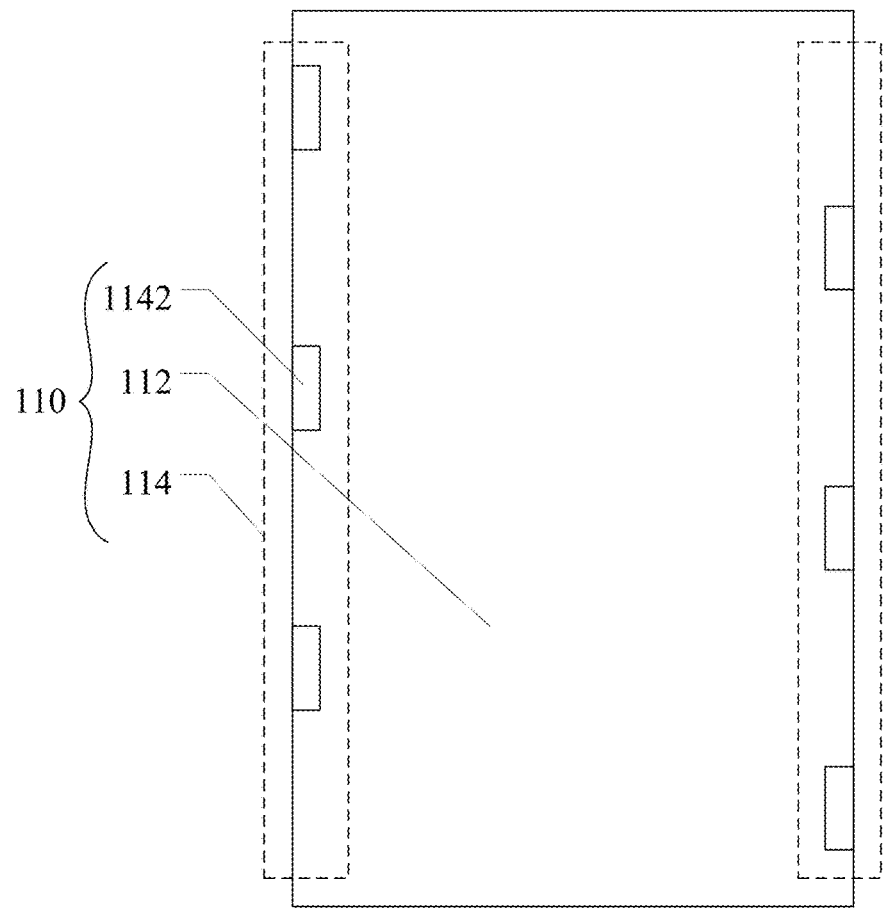
FIG. 4A is a plan view of a backboard provided by an embodiment of the present disclosure.
Figure 4B:
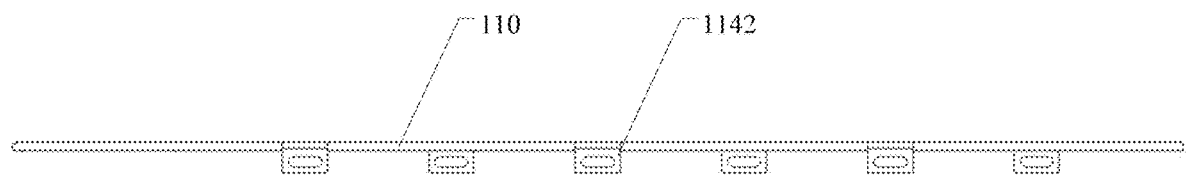
FIG. 4B is a side view of a backboard provided by an embodiment of the present disclosure.

FIG. 4A is a plan view of a backboard provided by an embodiment of the present disclosure; and FIG. 4B is a side view of a backboard provided by an embodiment of the present disclosure. As illustrated in FIG. 4A and FIG. 4B, the number of the above-described at least one fixing member 1142 is configured as plural; that is to say, the edge 114 of the backboard 110 includes a plurality of fixing members 1142, and these fixing members 1142 are arranged to be spaced from each other at the edge 114 of the backboard 110 along a circumference direction of the backboard 110.

For instance, as illustrated in FIG. 4A and FIG. 4B, each of two opposite edges 114 of the backboard 110 is provided with three fixing members 1142, and these three fixing members 1142 are arranged in a staggered manner along an extending direction of the edge 114, so as to fix the backlight module in a better way.

Figure 5:
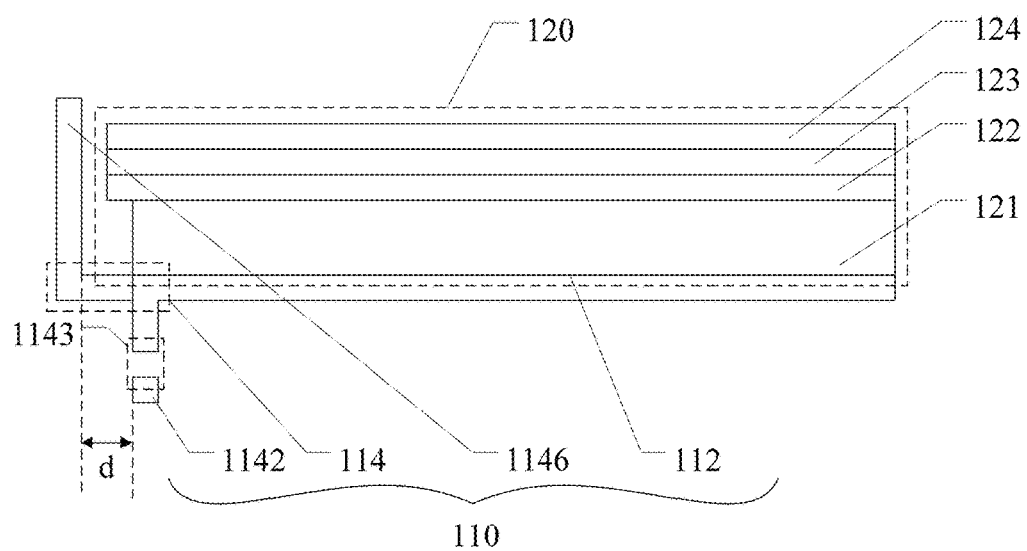
FIG. 5 is a partial cross-sectional view of another backlight module provided by an embodiment of the present disclosure.

FIG. 5 is a partial cross-sectional view of another backlight module provided by an embodiment of the present disclosure. As illustrated in FIG. 5, in the backlight module, a space d between an orthographic projection of the fixing member 1142 on a plane of the bearing surface 112 and an orthographic projection of the frame member 1146 on the plane of the bearing surface 112 is greater than zero. Furthermore, the orthographic projection of the frame member 1146 on the plane of the bearing surface 112 is located on a side of the orthographic projection of the fixing member 1142 on the plane of the bearing surface 112 away from the light source component 120. That is to say, with respect to the frame member 1146, the fixing member 1142 is located internally, so as to reserve a certain space for the fixing member 1142. For example, in the case where the fixing member 1142 is a buckle structure, the buckle protrusion would not go beyond the frame member 1146 upon passing through the fixing member 1142.

For example, as illustrated in FIG. 5, the space d described above is in the range of 0-0.25 mm.

For instance, in some examples, the backlight module can adopt a direct-lit backlight module, and can also adopt an edge-lit backlight module. Taking the edge-lit backlight module as an example, the light source component 120 can include a light guide plate 121, a diffusion sheet 122 and a prism film 123; a light source (not illustrated) can be disposed on a side edge of the light guide plate; the light guide plate 121, the diffusion sheet 122 and the prism film 123 can convert light emitted from the light source into area light which is uniform and has better directivity. As illustrated in FIG. 5, the light guide plate 121, the diffusion sheet 122 and the prism film 123 are disposed on the bearing surface 112 in this order. Of course, the embodiment of the present disclosure includes this case but is not limited thereto, and the light source component 120 can further include an antireflection film 124 disposed on a side of the prism film 123 away from the bearing surface 112, so as to increase an illumination brightness of the light source component 120.

An embodiment of the present disclosure further provides a display device. The display device includes any of the backlight modules described in the embodiments above.

Figure 6:
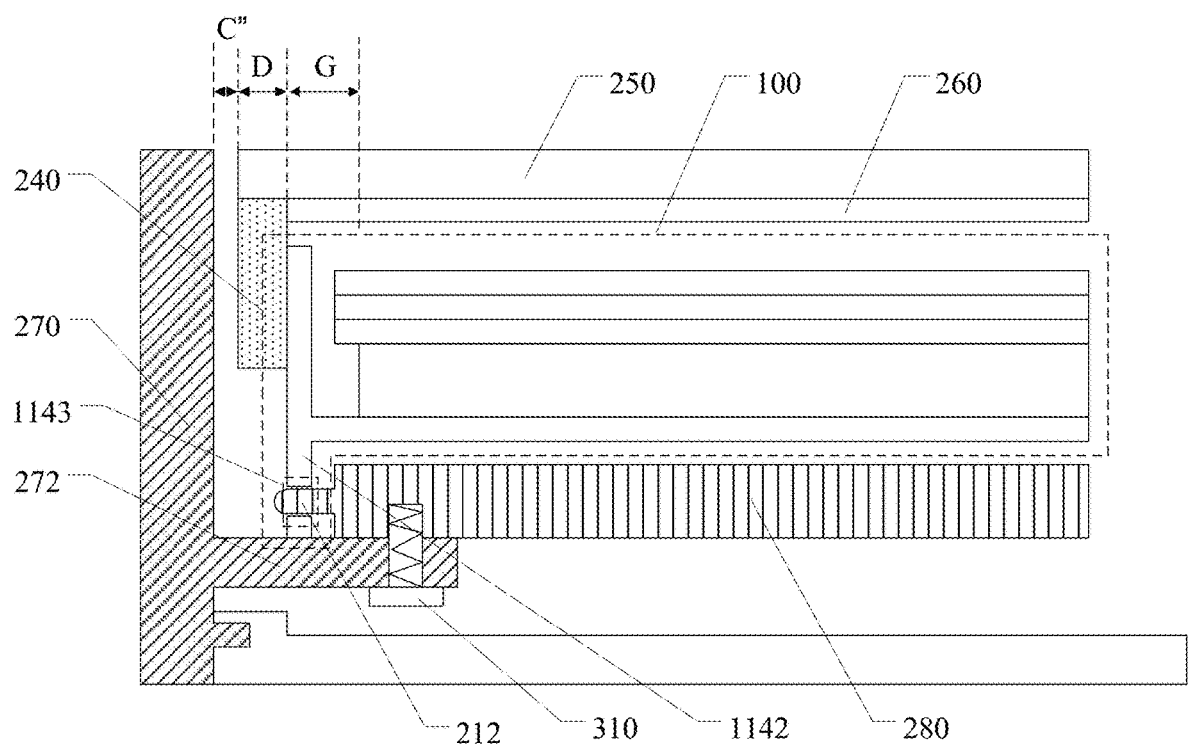
FIG. 6 is a cross-sectional view of a display device provided by an embodiment of the present disclosure.

For example, FIG. 6 is a cross-sectional view of a display device provided by an embodiment of the present disclosure. As illustrated in FIG. 6, the display device includes a backlight module 100. Particular structure of the backlight module 100 can be referred to the related description of FIG. 3 and FIG. 5. For example, as illustrated in FIG. 3, the backlight module 100 includes a backboard 110 and a light source component 120; the backboard 110 includes a bearing surface 112; the light source component 120 is located on the bearing surface 112. The backboard 110 includes a fixing member 1142 located at an edge 114 of the backboard 110, the fixing member 1142 extends along a first direction intersected with the bearing surface 112 and is located on a side of the backboard 110 away from the light source component 120.

For example, the display device can be an electronic product having display function, such as a television, a computer, a mobile phone, a navigator, a notebook computer and a digital photo album.

In the display device provided by the present embodiment, the backlight module 100 can be fixed with other part(s) (e.g., the mobile phone middle frame) through the fixing member 1142 newly added on the edge 114 of the backboard 110, which removes the need of additionally arranging a fastening buckle, so as to reduce the total width of the frame of the display device and hence to achieve a narrow bezel or even a frameless design of the display device.

For example, as illustrated in FIG. 6, the space C" can be designed smaller, or even designed as zero; the width D of the gel 240 can be designed as 0.2 mm; the width G of the backlight module 100 can be designed in the range of 0.3-0.5 mm; thus the total width M of the frame of the display device is M=(0.5~0.7 mm)+A. That is, the width of the display device is considerably reduced.

For instance, in some examples, as illustrated in FIG. 6, the first direction can be perpendicular to the bearing surface 112. That is to say, the fixing member 1142 can extend along the first direction which is perpendicular to the bearing surface 112.

For instance, in some examples, as illustrated in FIG. 6, upon the display device being a mobile phone, it includes a middle frame 280, e.g., a mobile phone middle frame, and the fixing member 1142 can be fixed with the middle frame 280 so as to fix the backlight module 100 on the middle frame 280.

For instance, in some examples, the fixing member 1142 includes a buckle structure, and the middle frame 280 includes a buckle fitter structure configured to be engaged with the buckle structure, so as to achieve fixing the fixing member with the middle frame. The case where the fixing member 1142 adopts a buckle structure and the middle frame 280 adopts a buckle fitter structure is convenient for the assembling operator to mount the backlight module in the display device and can reduce the assembling difficulty.

For instance, as illustrated in FIG. 6, the fixing member 1142 can include a buckle opening 1143, and the middle frame 280 can include a buckle protrusion 212; the buckle protrusion 212 can pass through the buckle opening 1143 so as to achieve fixing by engaging the buckle opening 1143 with the buckle protrusion 212. Of course, the embodiment includes this case but is not limited thereto, and the fixing member can also adopt other form(s). For example, the fixing member can include a threaded hole, and the backlight module is fixed in the display device by a screw and the threaded hole.

For example, the above-described buckle opening and buckle protrusion can be engaged with each other in an interference fit, so as to achieve the objective of tight fastening.

For instance, in some examples, as illustrated in FIG. 6, the backboard 110 further includes a frame member 1146 located at the edge 114 of the backboard 110, the frame member 1146 extends along a second direction intersected with the bearing surface 1120 and is located on a side of the backboard 110 where the light source component 120 is disposed. That is to say, the fixing member 1142 and the frame member 1146 are located at two sides of the backboard 110, respectively. In such case, the display device further includes: a liquid crystal (LC) panel 260 disposed on a side of the light source component 120 away from the backboard 110; and a cover plate 250 disposed on a side of the LC panel 260 away from the backboard 110. The LC panel 260 and the cover plate 250 can be fixed with the frame member 1146 through a gel 240. In this way, the frame member 146 can replace the role of the backlight module frame of the display device illustrated in FIG. 1A, FIG. 1B and FIG. 2. On one aspect, the frame member 1146 can protect the light source component 120, and prevent from the problem that the light source component 120 may be damaged due to an impact during transportation and usage. On another aspect, the frame member 1146 can also be fixed with a part such as LC panel 260 and cover plate 250 through the gel 240, so as to achieve fixing the part such as LC panel 260 and cover plate 250 with the backlight module 100.

For example, as illustrated in FIG. 6, the gel 240 is disposed on a side of the frame member 1146 away from the light source component 120.

For instance, in some examples, as illustrated in FIG. 6, the display device further includes a housing 270 disposed on a side of the gel 240 away from the light source component 120. The housing 270 can include a protrusion 272 which is projected towards the light source component 120. The protrusion 272 can be fixed with the middle frame 280 through a screw 310 so as to fix the housing 270 and the middle frame 280.

Figure 7:
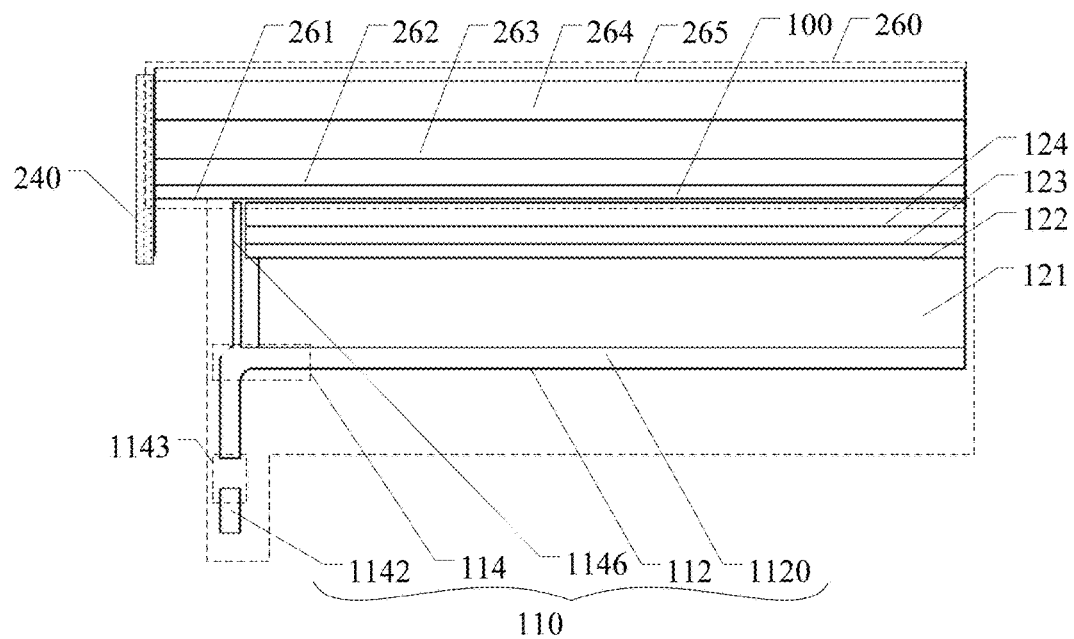
FIG. 7 is a cross-sectional view of another display device provided by an embodiment of the present disclosure.

FIG. 7 is a cross-sectional view of another display device provided by an embodiment of the present disclosure. As illustrated in FIG. 7, the display device includes a liquid crystal display (LCD) panel 260; the LCD panel 260 can include a first polaroid 261, a first substrate 262, a LC layer 263, a second substrate 264 and a second polaroid 265; the first substrate 262 and the second substrate 264 are configured to be cell-assembled; the LC layer 263 is disposed between the first substrate 262 and the second substrate 264; the first substrate 262 can be an array substrate; the second substrate 264 can be a color filter (CF) substrate; the first polaroid 261 is disposed on a side of the first substrate 262 away from the LC layer 263; the second polaroid 265 is disposed on a side of the second substrate 264 away from the LC layer 263.

Figure 8:
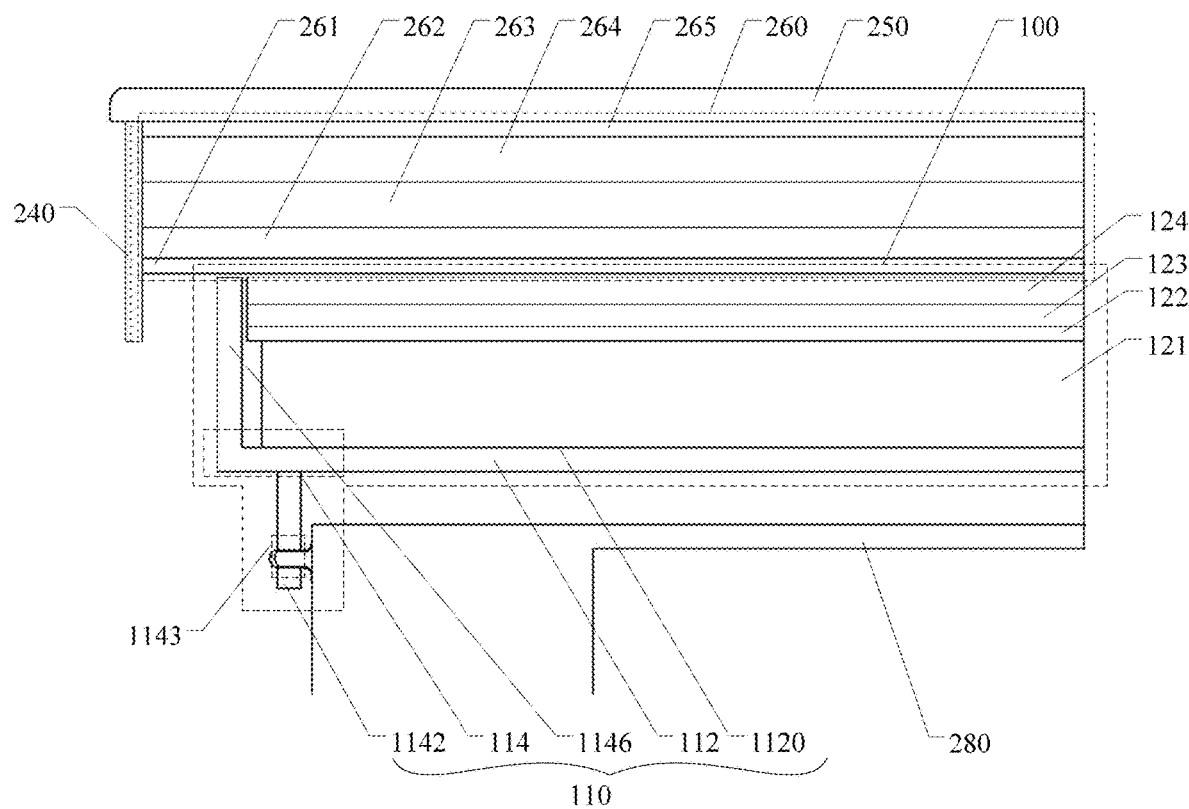
FIG. 8 is a cross-sectional view of another display device provided by an embodiment of the present disclosure.

FIG. 8 is a cross-sectional view of another display device provided by an embodiment of the present disclosure. As illustrated in FIG. 8, the display device can adopt the backlight module as illustrated in FIG. 5. As illustrated in FIG. 8, a space d between an orthographic projection of the fixing member 1142 on a plane of the bearing surface 112 and an orthographic projection of the frame member 1146 on the plane of the bearing surface 112 is greater than zero. That is to say, with respect to the frame member 1146, the fixing member 1142 is located internally, so as to reserve a certain space for the fixing member 1142. For example, in the case where the fixing member 1142 is a buckle structure, the buckle protrusion would not go beyond the frame member 1146 upon passing through the fixing member 1142. For example, the above-described space is in the range of 0~0.25 mm.

For instance, in some examples, as illustrated in FIG. 8, the frame member 1146 can replace the role of the backlight module frame of the display device illustrated in FIG. 1A, FIG. 1B and FIG. 2. On one aspect, the frame member 1146 can protect the light source component 120, and prevent from the problem that the light source component 120 may be damaged due to an impact during transportation and usage. On another aspect, the frame member 1146 can be fixed with a part such as LC panel 260 and cover plate 250 through the gel 240, so as to achieve fixing the part such as LC panel 260 and cover plate 250 with the backlight module 100.

Figure 9:
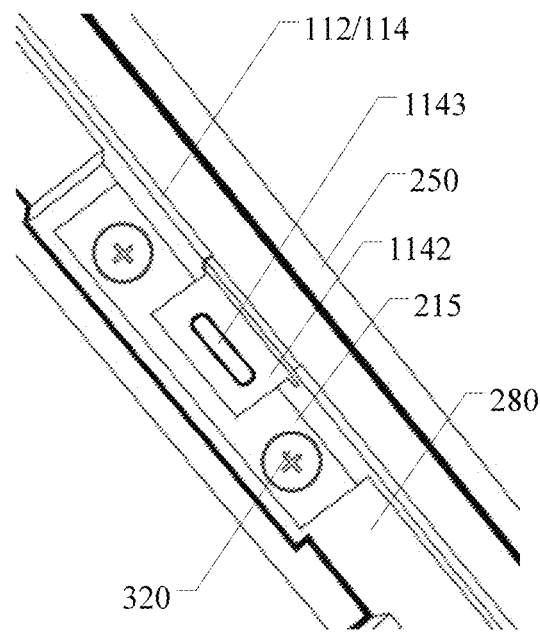
FIG. 9 is a schematic view illustrating a fixing member fixed with a middle frame in a display device provided by an embodiment of the present disclosure.

FIG. 9 is a schematic view illustrating a fixing member fixed with a middle frame in a display device provided by an embodiment of the present disclosure. As illustrated in FIG. 9, the fixing member 1142 can include a buckle opening 1143, the middle frame 280 can include a buckle piece 215 which can be fixed on the middle frame 280 through, for example, a screw 320. A buckle protrusion 212 can be disposed on the buckle piece 215, and the buckle protrusion 212 can pass through the buckle opening 1143 so as to achieve fixing by engaging the buckle opening 1143 with the buckle protrusion 212. Of course, the embodiment includes this case but is not limited thereto, and the fixing member can adopt other form(s). For example, the fixing member can include a threaded hole, and the backlight module is fixed in the display device by a screw and the threaded hole.

Figure 10:
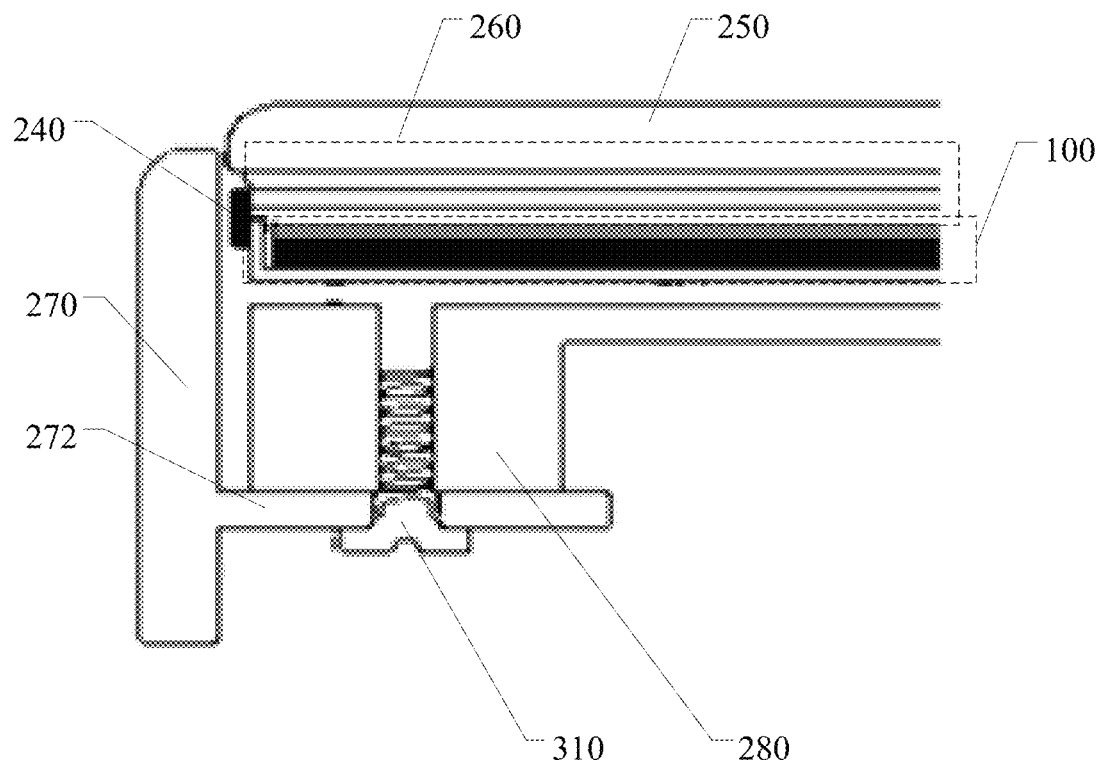
FIG. 10 is a partial cross-sectional view of a display device provided by an embodiment of the present disclosure.

FIG. 10 is a partial cross-sectional view of a display device provided by an embodiment of the present disclosure. As illustrated in FIG. 10, the display device further includes a housing 270 disposed on a side of the gel 240 away from the light source component 120. The housing 270 can include a protrusion 272 which is projected towards the light source component 120. The protrusion 272 can be fixed with the middle frame 280 through a screw 310 so as to fix the housing 270 and the middle frame 280.

Figure 11:
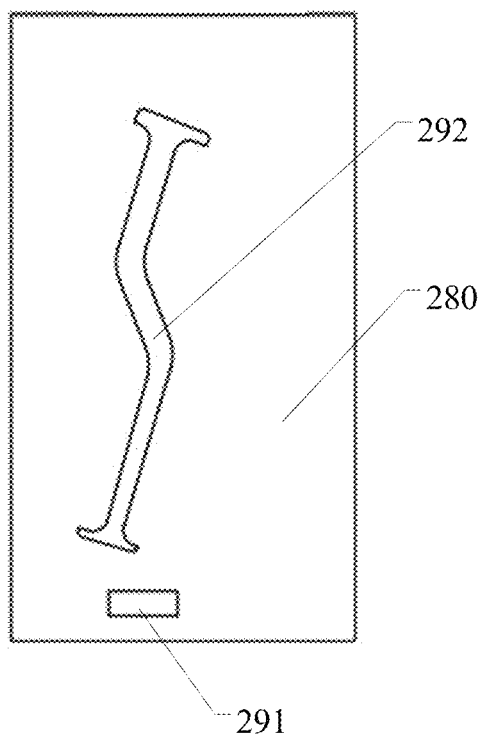
FIG. 11 is a schematic view illustrating a rear surface of a middle frame in a display device provided by an embodiment of the present disclosure.

FIG. 11 is a schematic view illustrating a rear surface of a mobile phone middle frame in a display device provided by an embodiment of the present disclosure. As illustrated in FIG. 11, the rear surface of the mobile phone middle frame 280 in the display device is further provided with: a drive IC 291 configured to drive the LCD panel 260 to perform displaying; and a flexible printed circuit board (FPCB) 292 configured to connect the LCD panel 260 with other electronic component(s) in the display device, for example, a circuit board provided with a CPU.

It should be explained that, for purpose of definite illustration, not all the structures of the display device are provided. In order to realize necessary function(s) of the display device, those skilled in the art can conceive of other structure(s) not illustrated, according to particular application scenario(s), without limited in the present disclosure.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments of the present disclosure can be combined.

The above are only specific implementations of the present disclosure, and the protection scope of the present disclosure is not limited thereto. Any modifications or substitutions easily occur to those skilled in the art within the technical scope of the present disclosure should be fallen within the protection scope of the present disclosure. Therefore, the protection scope of the present disclosure should be based on the protection scope of the claims and the equivalents thereof.

What is claimed is:

1. A backlight module, comprising:
a backboard having a bearing surface; and
a light source component located on the bearing surface,
wherein the backboard comprises at least one fixing member located at an edge of the backboard, the fixing member extends along a first direction and is located on a side of the backboard away from the light source component, and
the first direction is a direction from the light source component to the backboard,
the at least one fixing member and the backboard are integrally formed, and
an orthographic projection of the fixing member on the backboard has a first edge away from a center of the backboard, a portion of the backboard where the fixing member is located has a second edge away from a center of the backboard, the first edge is flush with the second edge in the first direction,
wherein the fixing member comprises a buckle structure, and is configured to fix the backlight module in a display device.

2. The backlight module according to claim 1, wherein the first direction is perpendicular to the bearing surface.

3. The backlight module according to claim 1, wherein the backboard further comprises a frame member located at the edge of the backboard, the frame member extends along a second direction and is located on a side of the backboard where the light source component is disposed, and the second direction is a direction from the backboard to the light source component.

4. The backlight module according to claim 3, wherein the frame member and the backboard are integrally formed, and the frame member is a bended edge of the edge of the backboard which is bent towards the second direction.

5. The backlight module according to claim 3, wherein a space between an orthographic projection of the fixing member on a plane of the bearing surface and an orthographic projection of the frame member on the plane of the bearing surface is greater than zero.

6. The backlight module according to claim 2, wherein the backboard further comprises a frame member located at the edge of the backboard, the frame member extends along a second direction and is located on a side of the backboard where the light source component is disposed, the second direction is a direction from the backboard to the light source component.

7. The backlight module according to claim 5, wherein the orthographic projection of the frame member on the plane of the bearing surface is located on a side of the orthographic projection of the fixing member on the plane of the bearing surface away from the light source component.

8. The backlight module according to claim 1, wherein the at least one fixing member comprises a plurality of fixing members, the plurality of fixing members are arranged to be spaced from each other at the edge of the backboard along a circumference direction of the backboard.

9. The backlight module according to claim 1, wherein the buckle structure comprises a buckle opening.

10. The backlight module according to claim 1, wherein the fixing member is a bended edge of the edge of the backboard which is bent towards the first direction.

11. A display device, comprising a backlight module, the backlight module comprising:

a backboard having a bearing surface; and a light source component located on the bearing surface, wherein the backboard comprises at least one fixing member located at an edge of the backboard, the fixing member extends along a first direction and is located on a side of the backboard away from the light source component, the first direction is a direction from the light source component to the backboard, the at least one fixing member and the backboard are integrally formed, and an orthographic projection of the fixing member on the backboard has a first edge away from a center of the backboard, a portion of the backboard where the fixing member is located has a second edge away from a center of the backboard, the first edge is flush with the second edge in the first direction, wherein the fixing member comprises a buckle structure, and is configured to fix the backlight module in a display device.

12. The display device according to claim 11, further comprising a middle frame, wherein the fixing member is fixed with the middle frame to fix the backlight module on the middle frame.

13. The display device according to claim 12, wherein the middle frame comprises a buckle fitter structure configured to be engaged with the buckle structure.

14. The display device according to claim 13, wherein the buckle structure comprises a buckle opening, and the buckle fitter structure comprises a buckle projection configured to be engaged with the buckle opening.

15. The display device according to claim 11, wherein the backboard further comprises a frame member located at the edge of the backboard, the frame member extends along a second direction and is located on a side of the backboard where the light source component is disposed, the second direction is a direction from the backboard to the light source component, the display device further comprises:

a liquid crystal (LC) panel disposed on a side of the light source component away from the backboard; and a cover plate disposed on a side of the LC panel away from the backboard, wherein the LC panel and the cover plate are fixed with the frame member through a gel.

16. The display device according to claim 15, wherein the gel is located on a side of the frame member away from the light source component.

* * * * *